Oct. 14, 1958     C. ZELNICK     2,855,686
MEASURING ROD LOCKING MEANS FOR DEPTH GAUGE MICROMETERS
Filed July 24, 1953
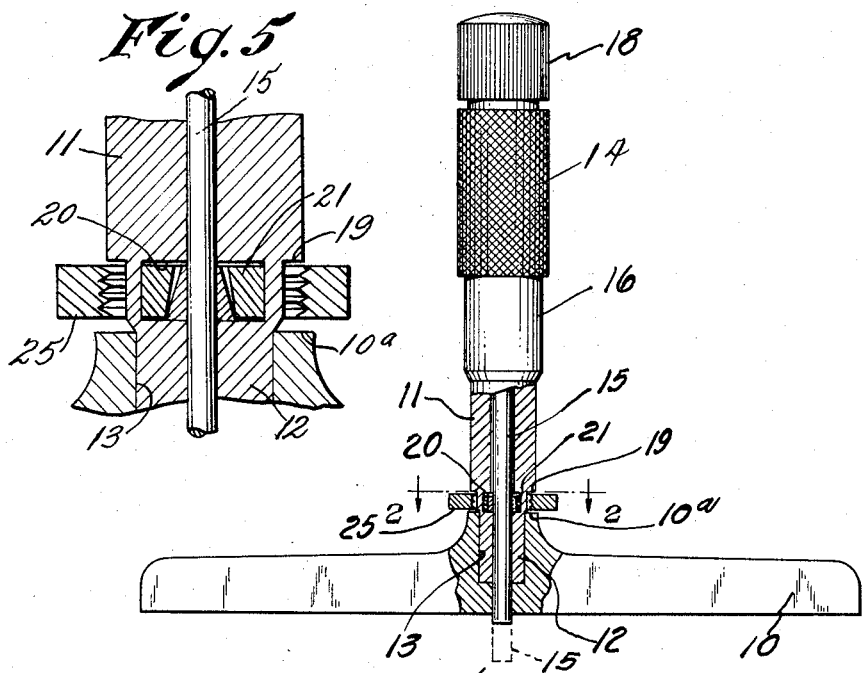
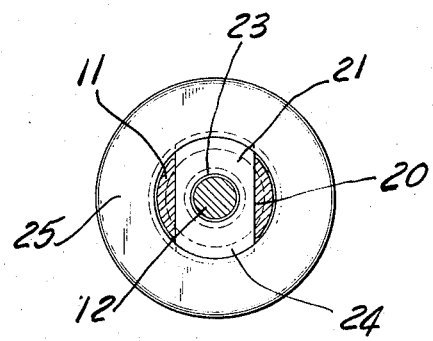
Fig. 2
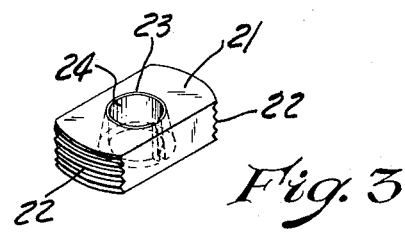
Fig. 3
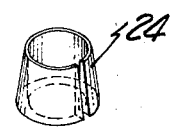
Fig. 4
INVENTOR.
Charles Zelnick
BY Learman+Learman
ATTORNEYS

United States Patent Office 2,855,686
Patented Oct. 14, 1958

2,855,686

MEASURING ROD LOCKING MEANS FOR DEPTH GAUGE MICROMETERS

Charles Zelnick, Saginaw, Mich., assignor to The Lufkin Rule Company, Saginaw, Mich.

Application July 24, 1953, Serial No. 370,059

4 Claims. (Cl. 33—170)

This invention relates to depth gauge micrometers, and more particularly to locking means for clamping the measuring rod thereof in adjusted measuring positions.

One of the prime objects of the invention is to design a depth gauge micrometer which permits the taking of extremely accurate readings by providing means for clamping the measuring rod, which in locking the rod does not disturb the adjustment thereof.

A further object of the invention is to provide a locking device which is easy and positive in operation and securely locks the rod so that there is no danger of the adjustment changing through handling of the instrument prior to taking the reading.

Another object of the invention is to design a locking means which is located on a gauge in a position where the operator need not alter his handhold, after adjusting the rod to measuring position, to securely lock the rod.

A further object of the invention is to provide a locking device which can be readily incorporated in present-day depth gauge micrometers without extensive changes or alterations in their present design.

A still further object of the invention is to design a locking device of the type described which is economical to manufacture and of durable construction, and which can be readily disassembled and re-assembled when necessary to replace the parts thereof.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawing:

Fig. 1 is a front elevational view of a depth gauge micrometer incorporating the instant locking mechanism shown in unlocked position, a portion of the hub or barrel of the gauge being broken away to show the assembled positions of the various parts thereof.

Fig. 2 is an enlarged, top plan view taken on the line 2—2 of Fig. 1, the base shoe being omitted from the view for clarity.

Fig. 3 is a perspective view of the screw segment which is mounted in the hub with the locking collet therein.

Fig. 4 is a perspective view of the screw segment which is mounted in the hub with the locking collet therein.

Fig. 4 is a perspective view of the collapsible locking collet only.

Figure 5 is an enlarged fragmentary view showing the locking mechanism in Figure 1 in detail.

Referring now more particularly to the accompanying drawings in which I have shown the preferred embodiment of my invention, the gauge comprises as usual a shoe 10 in which is mounted a tubular hub or barrel 11 with longitudinal spaced graduations (not shown) provided thereon, the lower reduced end 12 of the hub being secured in a central bore 13 in the shoe 10 by a setscrew (not shown).

The internally threaded upper end (not shown) of the stationary hub 11 is associated with a threaded micrometer spindle (not shown) which is adjustable relative to the hub 11, and a knurled sleeve 14 is associated with the spindle (not shown) and can be actuated to adjust the spindle and the measuring rod 15 axially with relation to the hub 11 as usual. A thimble 16, provided with circumferentially spaced graduations (not shown) in the conventional manner, is adjustable with the sleeve 14 relative to the graduated hub 11. The mechanism can also be adjusted by actuating a locking cap 18 which is operatively associated with the spindle (not shown) and the rod 15.

The mechanism thus far mentioned has been only briefly described, since it forms no part of the instant invention. In operation, any actuation of the sleeve 14 or cap 18 serves to adjust the rod 15 axially.

The instant invention is directed to a rod locking mechanism which can be actuated to clamp the rod 15 in a given measuring position. It is to be noted that the hub 11 is shouldered interjacent its ends as at 19 a spaced distance above the upper end 10a of the shoe 10 and that a laterally extending slot 20 is provided through the hub 11 just below the shoulder. Disposed in the slot 20 is a screw segment 21 of generally rectangular cross section with threaded arcuate ends 22. A tapered bored opening 23 through which the rod 15 extends and which accommodates a split, springy frusto-conical locking collet or ring 24 is provided in the segment 21. The taper of the collet 24 is slightly greater than the taper of the bored opening 23 and the diameters are such that the collet, when placed in the screw segment 21 originally, projects very slightly below the lower face thereof. Further, it is important to note that the segment 21 is of less thickness than the slot 20 and has a certain amount of vertical play therein. An interiorly threaded, outwardly knurled locking ring 25 of limited width so as to be adjustable between the edge 10a of the shoe 10 and the shoulder 19 is provided on the hub 11 as shown, and has threaded engagement with the ends of the segment 21.

In practice, to lock the measuring rod 15 in a given vertical position, it is only necessary to twirl the ring 25 counter-clockwise as viewed from the top of the device to adjust it upwardly relative to the threads 22 on the ends of the segment 21. After the ring 25 engages the shoulder 19, the segment 21 is brought down upon continued actuation of the ring 25 and the tapered collet 24 which projects slightly below the segment 21 engages the lateral or lower marginal edge of the slot 20, the collet, being split, collapsing because of the taper of the downwardly moving nut 21 to tightly grip the rod 15. When the locking ring 25 is twirled in the opposite direction the segment 21 is adjusted upwardly to release the rod 15, the relative difference in taper of the opening 23 and collet 24 causes the collet to spring to normal position.

It will thus be apparent that I have perfected a very practical and efficient mechanism for locking the measuring rod of a depth gauge micrometer in adjusted position.

What I claim is:

1. In a depth gauge having a tubular hub rigidly mounted in a base shoe and an axially adjustable measuring rod extending through said hub and shoe, the combination wherein said hub has a laterally disposed slot therein, a segment member having an opening through which said rod extends disposed in said slot, collapsible means disposed in the opening in said segment embracing said rod, and adjustable means on said hub to collapse said means and lock said rod in an adjusted measuring position.

2. In a depth gauge, a base shoe, a tubular hub mounted therein, said hub having a laterally disposed slot, a segment in said slot, a collapsible, tapered collet in said segment, the one end of said collet projecting slightly from said segment, an axially adjustable measuring rod extending therethrough, and means for adjusting said segment axially to bring the projecting end of said collet into engagement with a lateral marginal wall of said slot to press said collet into said segment and thereby collapse it to lock said rod.

3. In a depth gauge having a tubular hub mounted in a base shoe and an axially adjustable measuring rod extending through said hub and shoe, the combination wherein said hub has a horizontally disposed slot of rectangular cross section provided therethrough, a screw segment of rectangular cross section with threaded arcuate ends mounted in said slot and vertically adjustable therein, said segment having a tapered opening, a tapered split collet having a taper slightly greater than the taper of said opening disposed therein with the upper end thereof projecting slightly above the face of said segment, an interiorly threaded collar on said hub adjustable with relation to said segment to move said segment upwardly to engage the lateral marginal wall of the slot in said hub to press said collet into said segment and thereby collapse it to lock said rod.

4. The combination defined in claim 3 in which the hub is shouldered a spaced distance above the upper edge of the shoe to limit the upward adjustment of the collar.

References Cited in the file of this patent

UNITED STATES PATENTS

| | | |
|---|---|---|
| 612,601 | Bellows | Oct. 18, 1898 |
| 1,737,764 | Jacobs | Dec. 3, 1929 |
| 2,568,393 | Helbig | Sept. 18, 1951 |